Patented Feb. 7, 1939

2,146,595

UNITED STATES PATENT OFFICE 2,146,595

RUBBER INSULATING COMPOUND AND METHOD OF MAKING THE SAME

Emil W. Schwartz and Evan T. Croasdale, Bridgeport, Conn., assignors to General Electric Company, a corporation of New York No Drawing. Application September 16, 1936, Serial No. 101,075

9 Claims. (Cl. 106—13)

This invention relates broadly to an improved rubber insulating compound and to a method of making the same. More particularly it relates to, and has as a principal object to provide a rubber composition which, although not limited thereto, is especially adapted for insulating electrical conductors and cables operated in wet locations. The characteristic properties of our new and improved rubber insulating compound are due mainly to the particular ingredients and proportions thereof that are used in its manufacture. The marked resistance to moisture of the product of this invention is obtained by using deproteinized rubber in place of the ordinary crude rubber of commerce.

The present invention provides a rubber insulating compound which resists moisture to an outstanding degree, absorbing less than 0.01 gram of water per square inch of exposed surface area after immersion for 7 days in distilled water maintained at a temperature of 69° to 71° C., and which also, when subjected to a Bierer-Davis oxygen-bomb test for 21 days at a pressure of 300 pounds per square inch and at 70° C., shows a depreciation from that of the original compound of not more than 25 per cent in elongation and in tensile strength. Our rubber compound differs from known rubber compounds in its improved properties. Thus this invention provides a new rubber compound of increased usefulness in old applications and, also, of new utility.

It has been known heretofore that rubber can be deproteinized, that is, substantially freed of proteins, and that the use of deproteinized rubber in rubber compounding improves the water-resisting properties of the vulcanized or unvulcanized end-product. We make no broad claim to the use of deproteinized rubber as an ingredient of any rubber compound. We do, however, claim as new and novel the production of a particular rubber compound having properties peculiar only to itself by the use of deproteinized rubber, preferably in an amount within a particular range of proportions, which rubber is compounded with other ingredients of the kind and in the amount hereinafter specified. We also claim as new and novel the improved procedure we have developed for treating rubber to deproteinize and otherwise improve its useful properties and characteristics. Such improved deproteinized rubber is preferably employed in producing the rubber insulating compound of this invention.

The novel features which are characteristic of our invention are set forth in the appended claims. The invention itself, however, will best be understood from the following specification:

Rubber insulating compound produced in accordance with this invention comprises deproteinized rubber in an amount such, for instance, as about 29 per cent by weight and the remainder consisting of finely divided zinc oxide, finely divided inert filler, anti-oxidant, plasticizer and an organic accelerator capable of yielding nascent sulfur at vulcanization temperatures, for example, a thiuram polysulfide. More particularly, it comprises materials of the kinds just described advantageously combined in the following proportions:

(1) | Parts by weight
--- | ---
Deproteinized rubber | 29.0–34.0
Finely divided zinc oxide (dried) | 23.0–28.0
Finely divided inert filler (dried) | 37.0–44.0
Anti-oxidant | 0.3– 2.0
Thiuram polysulfide | 0.5– 2.0

Or, still more specifically:

(2) | Parts by weight
--- | ---
Deproteinized rubber | 29.0–34.0
Finely divided zinc oxide (dried) | 23.0–28.0
Finely divided clay (dried) | 14.0–16.0
Finely divided whiting (dried) | 23.0–28.0
Anti-oxidant | 0.3– 2.0
Tetra-methyl-thiuram disulfide | 0.5– 2.0

A small amount of plasticizer, for example, about 0.5 to 2.0 parts by weight, may be incorporated with the other ingredients, in the stated range of proportions, in the formulas given above.

If desired a small amount, for example, about 0.5 to 3.0 parts by weight, of carbon black, for instance such carbon blacks as those known to the trade as "P 33", "Gastex" and "Micronex" (and preferably the softer blacks such as "P 33" or "Gastex") may be a part of the finely divided inert filler of the formula given under (1), the remainder of the inert filler advantageously being whiting and clay of the kinds used in rubber compounding.

Fillers or filling materials are those substances in powder form that are incorporated in rubber compounds for the purpose of increasing the bulk of the compound. They are usually inert substances which generally produce strengthening effects on the vulcanized compound. In the preparation of rubber insulation for wires and cables, the kind and amount of filler have a material influence upon the properties of the end-product. Examples of inert fillers that may be used in practicing this invention are whiting, blanc fixe, clay and asbestine.

In rubber compounding certain finely divided substances or fillers which, when properly dispersed in rubber, provide the vulcanized product with improved physical properties, for example, greater energy of resilience, greater resistance to abrasion, higher modulus of elasticity and tensile strength, are often described as "reinforcing agents". Examples of such substances are zinc oxide, channel carbon black and so-called "soft blacks". Magnesium carbonate in an amount up to about 5 per cent by weight of the whole may also be used. Higher amounts of magnesium carbonate detrimentally affect the useful physical properties of a rubber compound, for example, by stiffening the compound excessively. Substances of the kind just stated comprise a part of the total filler content of the rubber compound produced by this invention. We use zinc oxide as one of such substances both to activate the particular thiuram polysulfide employed as an accelerator of vulcanization and to add a certain degree of strength and heat resistance to the end-product.

An anti-oxidant is a substance that inhibits or retards oxidation catalytically or by preferential absorption of oxygen. Anti-oxidants used in rubber compounding are usually synthetic organic substances. Examples of anti-oxidants that may be used in preparing our improved rubber insulating composition are those known to the trade as "Neozone D", "Neozone E", "Antox" and "B. L. E.". "Neozone D" is phenyl-beta-naphthylamine; "Neozone E" consists of about 75 per cent phenyl-beta-naphthylamine and about 25 per cent meta-toluylenediamine oxalate; "Antox" and "B. L. E." are aldehyde-amine reaction products.

An accelerator is any substance that hastens the vulcanization of rubber, causing it to take place in shorter time or at lower temperature or both. According to potency, or speed of action, accelerators are commonly classed by those skilled in the art as slow, medium, semi-ultra, and ultra accelerators. Thiuram polysulfides are commonly referred to in the trade as ultra accelerators, but actually they are rapid accelerators of vulcanization only in the presence of added sulfur. Thiuram polysulfides, for example, tetra-methyl-thiuram disulfide, known to the trade as "Tuads", and di-pentamethylene-thiuram tetrasulfide, known to the trade as "Tetrone A", split off nascent sulfur at vulcanization temperatures. The rubber compound of this invention therefore is cured without the addition of any other free sulfur.

Substances which soften a rubber compound and make it easier to mold or extrude are commonly known as plasticizers. Examples of plasticizers which may be used in practicing this invention, and which are mentioned for purpose of illustration only, are stearic acid, zinc laurate, vegetable oils such as palm oil, China-wood oil, linseed oil and the like, mineral oils and waxes, et cetera. Such substances also generally function as dispersing agents.

For plasticizing the rubber, as a means for promoting the rapid and uniform dispersion of the solid ingredients throughout the mass, and as a lubricant of the dies during the application of the rubber compound to a conducting core by extrusion means, a combination of paraffin wax and stearic acid is especially effective. Thus, with the other ingredients in a formula such as the one given immediately hereinafter, a plasticizer consisting, for example, of 1.0 part of paraffin wax and 0.25 part of stearic acid may be used. Green ozokerite, after being strained to free it of impurities, is also a suitable plasticizer. Thus we may use as a plasticizer a mixture of ozokerite and stearic acid, or a mixture of ozokerite, paraffin wax and stearic acid.

In order that our invention may be more fully understood and practiced by those skilled in the art to which it pertains the following specific example thereof is given, it being understood that it is merely illustrative in nature.

| | Parts by weight |
|---|---|
| Deproteinized rubber | 30.0 |
| Finely divided zinc oxide (dried) | 26.0 |
| Finely divided clay (dried) | 14.5 |
| Finely divided whiting (dried) | 27.0 |
| Carbon black | 0.7 |
| Anti-oxidant | 0.6 |
| Tetra-methyl-thiuram disulfide | 1.2 |

About 70 per cent of the total deproteinized rubber of a particular batch is first ground in a suitable machine, for example, a Banbury mixer, for about 3 minutes, after which the fillers and anti-oxidant are incorporated therewith, and the mixing continued for about 5 minutes. The remainder of the deproteinized rubber is now added and the whole mixed for a further period, say, about 8 minutes. The mass is then mixed on a rubber mill for about 5 minutes, after which it is strained and then aged for a few days. When ready to use, the tetra-methyl-thiuram disulfide is added to the stock prepared in the manner described, and the whole thoroughly mixed on a mill.

The stock is extruded in well-known manner on conductors by means of standard tubing practice; or it may be sheeted on a calender and applied in the form of a tape to any electrical conductor or cable which may be conveniently insulated by such means. The rubber insulation is then vulcanized in place on the conductor. In the case of a No. 14 (0.064 inch diameter) copper conductor covered with a 3/64-inch wall of rubber, the compound may be vulcanized by employing, for example, a 45-minute rise to about 25 to 35 pounds steam pressure (130.5° to 138.3° C.) and a 45-minute cure at such steam pressure, plus or minus 15 minutes variation either in the time in reaching the desired curing temperature or in the time of curing at such temperature, or in both the time in reaching the curing temperature, and in the time of curing thereat. As is well known to those skilled in the art, the time required for effectively curing rubber insulation in place on electrical conductors depends both upon the wall thickness of the rubber and the diameter of the conductor. The greater the wall thickness and the diameter of the conductor, the longer is the curing time required.

In producing the rubber insulating compound and insulated conductor of this invention we prefer to use natural rubber that has been treated, to deproteinize and otherwise improve it, in a manner such, for instance, as the following:

A convenient amount for handling, for example, about 110 pounds of No. 1 smoked sheet rubber is creped very finely on a single pass through a tight rubber mill. The creped rubber is put in a basket and placed in an autoclave, which is then about two-thirds filled with hot water. The lid of the autoclave is clamped on, and steam introduced until the rubber is under an absolute pressure of about 140 pounds per square inch (gauge pressure of about 125 pounds per square inch). This pressure represents a temperature of about 178.3° C. (353° F.). During pressure rise the exhaust valve is opened about every 5 minutes to assure the removal of all air from the autoclave. When a gauge pressure of about 125 pounds per square inch has been reached, the steam is turned off and the autoclave is directly fire-heated using gas as fuel. The gauge pressure is brought to about 150 pounds per square inch and held there by automatic control for approximately 1 to 2 hours, for example, for about 1½ hours. A gauge pressure of 150 pounds per square inch (absolute pressure about 165 pounds per square inch) represents a temperature of about 185.5° C. (366° F.).

The maximum temperature of treatment is critical. Heating the rubber to a temperature above about 205° detrimentally affects the useful physical properties of the rubber as a result of reversion or depolymerization of the rubber hydrocarbon. When efforts are made to use temperatures below about 175° C. (347° F.) in the digestion treatment, excess periods of time of digestion are required. Obviously, the longer the time of autoclaving, the more costly the process. There is therefore a certain minimum temperature that is critical in the sense that, if a substantially lower temperature were used, the treatment would be so uneconomical as to make the process of no practical success. For the reasons stated we therefore advantageously maintain the rubber during the described digestion treatment at a temperature between about 175° and 205° C.

The digested rubber, with original protein substances converted to soluble form, is now ready to be washed. Washing advantageously may be done in a steam-jacketed washer of the closed internal type, which washer also functions, at the end of the washing operation, as a dryer. It is important that the autoclaved rubber be kept totally immersed in water pending, and during, its transfer to the washer in order to avoid the detrimental effect of air upon the rubber. Hot water is run into the washer continuously, the overflow line being kept open to allow free circulation of water. Steam at low pressure, for instance, at about 15 pounds pressure, is turned into the jacket and rolls of the washer so that the water is kept boiling during the washing operation. Live steam, if desired, may be passed through the water in the washer. Boiling the water, in addition to facilitating the removal of water-soluble digestion products, also drives out any oxygen absorbed by, or entrapped in the water.

A novel and important feature of our washing operation consists in bubbling a non-oxidizing gas, that is, a gas in which rubber is inert, through the water during the washing operation. Gases such as hereinafter described with reference to the drying operation may be used for this purpose. Such procedure aids in preventing degradation of the rubber during washing. The inert gas also assists in removal of oxygen-containing gases from the hot wash water and in providing a non-oxidizing gaseous atmosphere within the washer. The rubber is continuously washed with the washer lid in closed position, until the wash water shows no color. Ordinarily, washing for about one hour is sufficient.

At the end of the washing period the water is drained from the washer and non-oxidizing gas, that is, a gas in which rubber is inert, is passed into the washer while continuing the introduction of steam at a temperature above 212° F. for the purpose of drying the rubber. Nitrogen, hydrogen, carbon dioxide, producer gas, or mixtures of such gases, are examples of non-oxidizing gases that may be used.

A suitable amount of an anti-oxidant such, for example, as "Neozone A", "Neozone D", "Neozone E", "Antox", "B. L. E.", or a mixture of such anti-oxidants, is now incorporated with the washed, but undried, rubber. The autoclaving operation removes very powerful and useful anti-oxidants naturally occurring in crude rubber. We have found that the otherwise detrimental effect of the this loss of naturally occurring anti-oxidants upon the useful properties of the rubber may be corrected conveniently and most effectively by compounding a synthetic organic anti-oxidant with the washed rubber prior to the drying operation. About 18 ounces of an anti-oxidant such as "Neozone A" (phenyl-alpha-naphthylamine) is sufficient for effectively treating a 110-pound batch of rubber. Addition of anti-oxidant at this stage also greatly improves the coherence of the purified rubber. We have found that it also aids in preventing degradation of the rubber during subsequent operations, for instance, the drying operation. Addition of a synthetic anti-oxidant to the digested and washed rubber prior to the drying operation is accordingly an essential and important feature of our improved process.

Having added the anti-oxidant, the lid of the washer is clamped shut. After about 10 minutes the steam is turned off the rolls. Non-oxidizing gas is passed into the washer during the entire drying operation. When producer gas is the non-oxidizing gas, a pilot light is kept burning at the exhaust opening. The producer gas is checked at regular intervals to be sure that it is essentially free from oxygen. The deproteinized rubber is dried by this means, at a temperature of about 110° to 125° C., in approximately 20 minutes after the water has been drained from the washer.

The dried rubber is removed from the washer and slabbed on cooling. The purified rubber is dark in color. When hot it is very plastic; on cooling it becomes about as elastic as smoked sheet rubber that has been worked on a rubber mill for a short time. The treated rubber is aged in storage for several days prior to use.

The process just described provides a commercially successful means for treating rubber to deproteinize it, and otherwise to improve its useful properties. Tests on the commercially produced deproteinized rubber show as low as 0.13 per cent nitrogen, which, when the protein content is calculated as 6.25 times the nitrogen content, represents about 0.8 per cent protein. Obviously, the extent of the reduction in protein content is dependent upon the protein content of the starting rubber, but in general it may be stated that by the described procedure the nitrogen content of ordinary crude rubbers is reduced to less than 0.8 per cent. The process depends for its practical success upon washing the digested rubber, to remove water-soluble matter, such as protein-digestion products, sugars, soluble-inorganic salts, as well as any mechanical impurities, rapidly, efficiently and economically, without degrading the rubber in any way such, for instance, as by exposure to oxygen or to excessive mechanical working; and, further, upon effectively and quickly drying the washed rubber likewise without degradation.

As a modification of the above-described process, we may digest the rubber in a hot dilute solution of sodium chloride or in a weak alkali solution, for instance, a solution of sodium hydroxide, the subsequent washing and drying operations being essentially the same as when water alone is used. Thus, to facilitate solubilization of protein substances of the rubber, we may use in the digestion treatment of 100 pounds of crude rubber a dilute aqueous solution containing, for example, 2 pounds of sodium chloride; or, for the same amount of rubber, a dilute aqueous solution containing, for instance, 300 grams of sodium hydroxide. In certain cases, too, for instance, when it is desired to obtain a rubber of even lower nitrogen content, an alcohol wash or washes may be applied to the rubber after the water wash. Such alcohol wash may be used after the water wash of rubber digested in the presence of water alone, or in aqueous solutions of sodium chloride, sodium hydroxide, or other agents having a solubilizing effect upon protein substances contained in crude rubber. By the methods just described, we have reduced the nitrogen content of crude rubber to as low as about 0.05 to 0.10 per cent; and in the case of crude rubber having an initial nitrogen content of about 0.30 per cent, to as low as about 0.02 per cent.

The superior and characteristic properties of rubber compound produced in accordance with this invention will immediately be appreciated by those skilled in the art from the following description of the product, based on the results of tests made by methods approved by the trade:

A 2-inch mark on a 6-inch test piece of a rubber compound made as herein described stretches at least 400 per cent before breaking. The set in a 2-inch mark on a 6-inch test piece one minute after release is not greater than 3/8 inch. The initial tensile strength of the compound is at least about 1300 pounds per square inch. The procedures for making elongation, set and tensile strength tests are described under specification D-27-35T of the American Society for Testing Materials. The product conforms in all respects to the electrical requirements of a rubber insulation as set forth in said specification D-27-35T.

Further, when a sample of vulcanized rubber compound produced in accordance with this invention has been subjected to a Bierer-Davis oxygen-bomb test for 21 days under a pressure of 300 pounds per square inch and at 70° C., it shows a depreciation from that of the original compound of not more than 25 per cent in elongation and in tensile strength.

The low moisture-absorbing properties of a compound produced in accordance with this invention may be established in the following manner:—

A 12-inch length of the insulated conductor, with all coverings removed, is bent in the shape of a U. The ends of the sample are inserted in the holes of a stopper that fits tightly a receptacle filled with distilled water. The insulated conductor is so adjusted that a length of 9 inches is submerged in the distilled water when the stopper is inserted in the container. After immersion for 7 days in the distilled water, which is maintained at a temperature of 69° to 71° C., the sample is removed, wiped free of surface water and weighed. It will be found that the increase in the weight (moisture-absorption factor) of the rubber insulation is less than 0.010 gram per square inch of the exposed surface area.

The following more specific data are given as illustrative of the improved moisture-resisting properties of rubber compounds produced in accordance with this invention:

*Water-absorption test, 7 days in distilled water, temp. 69°–71° C.*

| Sample | Water absorption in grams per sq. in. | | |
| --- | --- | --- | --- |
| | Unaged specimen | Aged 336 hrs. in oxygen bomb | Aged 20 days at 75° C. |
| Rubber compound made in accordance with this invention | 0.00173 | 0.00923 | 0.0094 |
| Sample No. 1, rubber compound made with ordinary crude rubber | 0.0195 | 0.0124 | 0.0227 |
| Sample No. 2, rubber compound made with ordinary crude rubber | 0.0179 | 0.0239 | 0.0290 |
| Sample No. 3, rubber compound made with ordinary crude rubber | 0.0285 | | |

Rubber compound produced in accordance with this invention has particular utility as insulation for cables subjected to excessive moisture conditions, for example, non-leaded submarine cables, non-metallic parkway cables, and the like.

By the term "deproteinized rubber" as used herein we mean rubber which has been treated to solubilize protein substances contained in crude rubber, which solubilized substances are subsequently removed from the treated rubber.

What we claim as new and desire to secure by Letters Patent of the United States is:—

1. A vulcanizable rubber insulating compound consisting substantially of 29 to 34 parts by weight of deproteinized rubber 23 to 28 parts by weight of finely divided zinc oxide, 37 to 44 parts by weight of finely divided inert filler, and not more than 6 parts by weight of other rubber compounding substances, one of which is an anti-oxidant and another of which is an organic compound capable of yielding nascent sulfur at vulcanization temperature, said rubber compound in a vulcanized state having an initial tensile strength of at least 1300 pounds per square inch and an initial elongation of at least 400 per cent before breaking, showing a depreciation from that of the original vulcanized compound of not more than 25 per cent in elongation and in tensile strength when subjected to a Bierer-Davis oxygen-bomb test for 21 days under a pressure of 300 pounds per square inch and at 70° C., and having a moisture-absorption factor of not more than 0.01 gram per square inch of exposed surface area after immersion for 7 days in distilled water maintained at a temperature of 69° to 71° C.

2. A vulcanized rubber insulating compound having an initial tensile strength of at least 1300 pounds per square inch and an initial elongation of at least 400 per cent before breaking, showing a depreciation from that of the original compound of not more than 25 per cent in elongation and in tensile strength after subjection to a Bierer-Davis oxygen-bomb test for 21 days under a pressure of 300 pounds per square inch and at 70° C., and having a moisture-absorption factor of not more than 0.01 gram per square inch of exposed surface area after immersion for 7 days in distilled water maintained at a temperature of 69° to 71° C., said compound being the product of vulcanizing a mixture consisting substantially of 29 to 34 parts by weight of deproteinized rubber, 23 to 28 parts by weight of finely divided zinc oxide, 37 to 44 parts by weight of finely divided clay and whiting, and not more than 6 parts by weight of other rubber compounding substances, one of which is an anti-oxidant, another of which is a plasticizer, and another of which is thiuram polysulfide.

3. A vulcanizable rubber insulating compound consisting essentially of the following ingredients within the stated range of proportions:

| | Parts by weight |
|---|---|
| Deproteinized rubber | 29.0–34.0 |
| Finely divided zinc oxide | 23.0–28.0 |
| Finely divided inert filler | 37.0–44.0 |
| Anti-oxidant | 0.3– 2.0 |
| Thiuram polysulfide | 0.5– 2.0 | said compound in a vulcanized state having an initial tensile strength of at least 1300 pounds per square inch and an initial elongation of at least 400 per cent before breaking, showing a depreciation from that of the original vulcanized compound of not more than 25 per cent in elongation and in tensile strength after subjection to a Bierer-Davis oxygen-bomb test for 21 days under a pressure of 300 pounds per square inch and at 70° C., and having a moisture-absorption factor of not more than 0.01 gram per square inch of exposed surface area after immersion for 7 days in distilled water maintained at a temperature of 69° to 71° C.

4. A vulcanized rubber insulating compound having an initial tensile strength of at least 1300 pounds per square inch and an initial elongation of at least 400 per cent before breaking, showing a depreciation from that of the original compound of not more than 25 per cent in elongation and in tensile strength after subjection to a Bierer-Davis oxygen-bomb test for 21 days under a pressure of 300 pounds per square inch and at 70° C., and having a moisture-absorption factor of not more than 0.01 gram per square inch of exposed surface area after immersion for 7 days in distilled water maintained at a temperature of 69° to 71° C., said compound being the product of heating at a vulcanizing temperature a mix consisting essentially of the following ingredients within the stated range of proportions:

| | Parts by weight |
|---|---|
| Deproteinized rubber | 29.0–34.0 |
| Finely divided zinc oxide | 23.0–28.0 |
| Finely divided clay | 14.0–16.0 |
| Finely divided whiting | 23.0–28.0 |
| Anti-oxidant | 0.3– 2.0 |
| Tetra-methyl-thiuram disulfide | 0.5– 2.0 |

5. Electrical insulation comprising a vulcanized rubber compound obtained by heating at a vulcanizing temperature a mixture consisting essentially of 29 to 34 parts by weight of deproteinized rubber, 23 to 28 parts by weight of finely divided zinc oxide, 37 to 44 parts by weight of finely divided inert filler, and not more than 6 parts by weight of other rubber compounding substances, one of which is an anti-oxidant and another of which is a thiuram polysulfide, said rubber compound having an initial tensile strength of at least about 1300 pounds per square inch and an initial elongation of at least about 400 per cent before breaking, showing a depreciation from that of the original compound of not more than 25 per cent in elongation and in tensile strength when subjected to a Bierer-Davis oxygen-bomb test for 21 days under a pressure of 300 pounds per square inch and at 70° C., and having a moisture-absorption factor of not more than 0.01 gram per square inch of exposed surface area after immersion for 7 days in distilled water maintained at a temperature of 69° to 71° C.

6. An insulated electrical conductor comprising a conducting core insulated with a vulcanized rubber compound which is the product of vulcanizing a mixture consisting substantially of 29 to 34 parts by weight of deproteinized rubber, 23 to 28 parts by weight of finely divided zinc oxide, 37 to 44 parts by weight of finely divided inert filler, and not more than 6 parts by weight of other rubber compounding substances, one of which is an anti-oxidant and another of which is thiuram polysulfide, said rubber compound having an initial tensile strength of at least about 1300 pounds per square inch and an initial elongation of at least about 400 per cent before breaking, showing a depreciation from that of the original compound of not more than 25 per cent in elongation and in tensile strength when subjected to a Bierer-Davis oxygen bomb test for 21 days under a pressure of 300 pounds per square inch and at 70° C., and having a moisture-absorption factor of not more than 0.01 gram per square inch of exposed surface area after immersion for 7 days in distilled water maintained at a temperature of 69° to 71° C.

7. A process of making a vulcanized rubber insulating compound having an initial tensile strength of at least 1300 pounds per square inch and an initial elongation of at least 400 per cent before breaking, showing a depreciation from that of the original compound of not more than 25 per cent in elongation and in tensile strength after subjection to a Bierer-Davis oxygen-bomb test for 21 days under a pressure of 300 pounds per square inch and at 70° C., and having a moisture-absorption factor of not more than 0.01 gram per square inch after immersion for 7 days in distilled water maintained at a temperature of 69° to 71° C., said process comprising forming a substantially uniform mixture of 29 to 34 parts by weight of deproteinized rubber, 23 to 28 parts by weight of finely divided zinc oxide, 37 to 44 parts by weight of finely divided inert filler and 0.3 to 2.0 parts by weight of anti-oxidant, aging the resulting compound, incorporating into the aged compound 0.5 to 2.0 parts by weight of thiuram polysulfide and vulcanizing the deproteinized rubber with the said polysulfide.

8. A process of insulating an electrical conductor with vulcanized rubber insulation having an initial tensile strength of at least 1300 pounds per square inch and an initial elongation of at least 400 per cent before breaking, showing a depreciation from that of the original compound of not more than 25 per cent in elongation and in tensile strength after subjection to a Bierer-Davis oxygen-bomb test for 21 days under a pressure of 300 pounds per square inch and at 70° C., and having a moisture-absorption factor of not more than 0.01 gram per square inch after immersion for 7 days in distilled water maintained at a temperature of 69° to 71° C., said process comprising forming a substantially uniform mixture of 29 to 34 parts by weight of deproteinized rubber, 23 to 28 parts by weight of finely divided zinc oxide, 14 to 16 parts by weight of finely divided clay, 23 to 28 parts by weight of finely divided whiting and 0.3 to 2.0 parts by weight of anti-oxidant, aging the said mixture, incorporating into the aged mixture 0.5 to 2.0 parts by weight of tetra-methyl-thiuram disulfide, applying the resulting rubber compound to an electrical conductor as an insulation therefor, and heating the said compound in place on the conductor at a temperature and for a period of time sufficient to vulcanize the deproteinized rubber with sulfur released under heat from the tetra-methyl-thiuram disulfide.

9. An insulated electrical conductor comprising in combination a conductor and an insulating rubber covering obtained by vulcanizing a mixture consisting substantially of the following ingredients within the stated range of proportions:

| | Parts by weight |
|---|---|
| Deproteinized rubber | 29.0–34.0 |
| Finely divided zinc oxide | 23.0–28.0 |
| Finely divided clay | 14.0–16.0 |
| Finely divided whiting | 23.0–28.0 |
| Anti-oxidant | 0.3– 2.0 |
| Plasticizer | 0.5– 2.0 |
| Tetra-methyl-thiuram disulfide | 0.5– 2.0 | said covering having an initial tensile strength of at least 1300 pounds per square inch and an initial elongation of at least 400 per cent before breaking, showing a depreciation from that of the original of not more than 25 per cent in elongation and in tensile strength after subjection to a Bierer-Davis oxygen-bomb test for 21 days under a pressure of 300 pounds per square inch and at 70° C., and having a moisture-absorption factor of not more than 0.01 gram per square inch after immersion for 7 days in distilled water maintained at a temperature of 69° to 71° C.

EMIL W. SCHWARTZ.
EVAN T. CROASDALE.